United States Patent [19]

Takagi et al.

[11] 3,708,186
[45] Jan. 2, 1973

[54] PIPE JOINT
[76] Inventors: Tatsuya Takagi, 6-10 Araebisumachi; Teruya Takagi, 6-4 Araebisumachi, both of Nishinomiya, Japan
[22] Filed: March 9, 1971
[21] Appl. No.: 122,424

[30] Foreign Application Priority Data
Dec. 5, 1970 Japan..............................45/107740

[52] U.S. Cl...............................285/341, 285/382.7
[51] Int. Cl................................................F16l 19/08
[58] Field of Search......285/321, 339, 341, 342, 343, 285/382.7

[56] References Cited
UNITED STATES PATENTS 2,333,470 11/1943 Cowles............................285/341 X
3,025,084 3/1962 Franck..........................285/382.7 X
3,235,292 2/1966 Phillips............................285/343 X
3,498,646 3/1970 De Puy................................285/339

FOREIGN PATENTS OR APPLICATIONS 456,268 7/1968 Switzerland.........................285/343
692,159 5/1953 Great Britain.......................285/342

Primary Examiner—David J. Williamowsky
Assistant Examiner—David H. Corbin
Attorney—Toren & McGeady

[57] ABSTRACT

Pipe joint comprising a main body, a ring fitted in an annular groove of a pipe, a sleeve fitted over the pipe and a clamping member arranged to force the sleeve to move axially of the pipe into intimate engagement with the main body and the pipe.

4 Claims, 5 Drawing Figures

PATENTED JAN 2 1973 3,708,186

INVENTORS
TATSUYA TAKAGI
BY TERUYA TAKAGI
Torem and McCready
ATTORNEYS

PIPE JOINT

BACKGROUND OF THE INVENTION

Generally, threaded joints and welded joints are used for joining pipes of steel or other metal. However, these joints have disadvantages. The former present the problem of weakness by thread cutting, and the latter are high in cost and lack reliability in the results of working on them. In addition, scale tends to form on the inner surfaces of the parts worked on and such scale is hard to remove.

A proposal has been made to use an intrusion joint in order to obviate the aforementioned disadvantages of threaded joints and welded joints. FIG. 3 shows an example of this type of joint in which a sleeve $b$ formed on its inner case with a case hardened protrusion $c$ is loosely fitted over a pipe $a$, and a cap nut $d$ is mounted over the sleeve to clamp the same to the pipe $a$ so that the protrusion $c$ may bite into the pipe $a$. Thus, the protrusion in the sleeve is effective to ensure that pipes are joined together firmly and at the same time it serves as a packing. The joint of this type requires a torque of high order for causing the protrusion to bite into the pipe, and consequently the operation must be performed by placing pipes on a work table of high strength. Moreover, the joint of this type has the disadvantage of not being applicable in pipes of larger diameters which are commonly used because it is not possible to manually exert a force of the order needed to cause the protrusion to bite into the pipe. Another disadvantage in joints of this type is the inability to effect perfect joining when used in pipes of small thickness, because the pipe is contracted inwardly as the protrusion $c$ of the sleeve bites into the pipe as shown in FIG. 3 and consequently the protrusion only enters slightly into the tube.

SUMMARY OF THE INVENTION

This invention relates to joints in general, and more particularly it is concerned with a threadless joint of the type which is mainly used for joining pipes of steel, stainless steel or other metal.

This invention has as its object the provision of a special threadless joint which obviates the aforementioned disadvantages of the prior art. According to the present invention, there is provided a pipe joint of the type described comprising a main body, an incomplete ring having a cutout portion in its circumference which is fitted over an annular groove formed by form rolling by rotating the roller of a known manually operated pipe cutting tool of the roller type while causing the same to press against the pipe, a sleeve fitted over the pipe, and a cap nut or other clamping member mounted on the sleeve for clamping the same to the pipe, whereby a portion of the sleeve encloses the ring to provide a firm connection to the pipes and a fluid-tight seal between the joint and pipe.

Additional objects as well as features and advantages of this invention will become evident from the description set forth hereinafter when considered in conjunction with the accompanying drawings.

DESCRIPTION OF THE PREFERRED EMBODIMENTS

Figure 1:
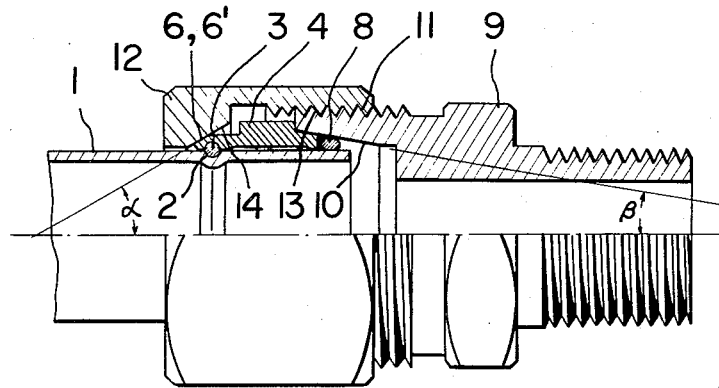
FIG. 1 is a central longitudinal sectional view of the pipe joint comprising one embodiment of this invention.
Figure 2:
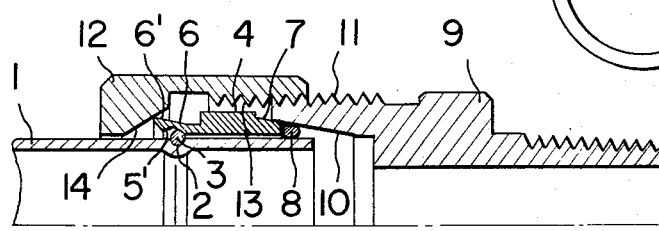
FIG. 2 is a view similar to FIG. 1 but showing the pipe joint before the sleeve is clamped to the pipe.
Figure 4:
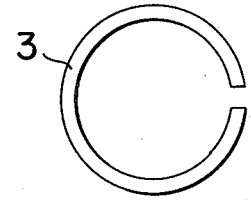
FIG. 4 is a front view of the incomplete ring.
Figure 3:
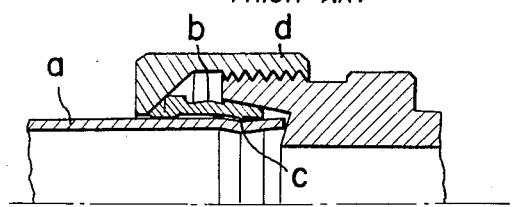
FIG. 3 is a view of one example of the intrusion joint of the prior art shown for comparison with the pipe joint of this invention.
Figure 5:
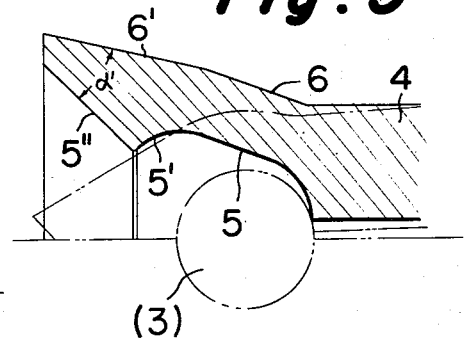
FIG. 5 is an enlarged sectional view of one end portion of the sleeve.

One embodiment of this invention will now be explained with reference to the drawings. FIG. 1 and FIG. 2 show the pipe joint according to this invention used for joining pipes of small thickness together, FIG. 1 showing the joint after the sleeve has been clamped to the pipe and FIG. 2 showing the joint before the sleeve is clamped to the pipe.

In the drawings, 1 is a pipe, and 2 an annular groove semi-circular in cross-section which is formed on the upper surface of the tube 1 by form rolling. 3 is an incomplete ring made of piano wire or stainless steel wire and formed with a cutout portion in its circumference which ring is adapted to be received in the groove 2 so that a one-half portion thereof will be embedded in the groove. 4 is a sleeve made of mild steel or stainless steel and having one end portion divergently extending in cone shape which includes a first inner surface 5, an enclosing inner surface 5' contiguous with the surface 5 and disposed anteriorly thereto, a second inner surface 5" contiguous with the surface 5' and disposed anteriorly thereto, a first outer surface 6 substantially parallel to the first inner surface 5, and a second outer surface 6' contiguous with the surface 6 and disposed anteriorly thereto to extend with a somewhat smaller angle of divergence than the angle of divergence with which the surface 6 extends. The special configuration of the inner and outer surfaces of the divergently extending end portion of the sleeve described above is intended to cause the sleeve to intimately enclose the ring without undergoing any plastic deformation when treated by a reducing operation.

The other end portion of the sleeve 4 has an inner diameter slightly larger than the outer diameter of the pipe and is formed with a tapered outer surface 7 portion. The inner end portion of the pipe 1 extends further inwardly than the other end portion of the sleeve 4, and an annular packing 8, such as an O-ring made of synthetic rubber, is mounted on the outer surface of the inner end portion of the pipe 1 in a position in which the packing 8 is maintained in intimate contact with the other end of the sleeve 4.

9 is a main body of the joint which is formed at its mouth with a divergently extending inner surface 10 which engages with the tapered outer surface 7 of the sleeve 4. The main body 9 is also formed with a threaded portion 11 on the outer surface of its mouth. 12 is a cap nut mounted on the sleeve 4 and main body 9 of the joint. The cap nut 12 is formed on the inner surface of one end portion thereof with a threaded portion 13 in threaded engagement with the threaded portion 11 of the main body 9. The cap nut 12 is also formed with a tapered inner surface 14 at its other end portion which tapered inner surface forms a cone angle $\alpha$ for clamping the second cone-shaped outer surface 6' of the sleeve 4 to the pipe 1.

The second outer surface 6' and second inner surface 5" form an angle α' therebetween which is approximately equal to the angle α, the angle α' becoming identical with the angle α after the sleeve is clamped to the pipe.

The manner of using the pipe joint according to this invention and its operation will now be explained. The ring 3 is first fitted in the annular groove 2 on the pipe 1, and the sleeve 4 is fitted over the pipe 1 in a position in which the first inner surface 5 abuts against the ring 3. Then, the main body 9 of the joint is mounted on the sleeve 4 and the cap nut 12 is mounted on the sleeve 4 and its threaded portion 13 is brought into threaded engagement with the threaded portion 11 on the outer surface of pipe 1. If a clamping force is exerted on the cap nut 12 in this position, the enclosing inner surface 5' of the sleeve 4 will be pressed by the tapered inner surface 14 of cap nut 12 and bent inwardly thereby along the outer surface of the ring 3 so as to enclose and intimately contact the same. The ring 3 is completely enclosed by the enclosing inner surface 5' of sleeve 4 when the second inner surface 5" of sleeve reaches the wall of pipe. After the ring 3 is completely enclosed by the sleeve 4 in this way, the clamping force exerted by the cap nut 12 on the sleeve 4 acts such that the clamping force moves the sleeve axially into the interior of the main body 9 of joint. As a result, the tapered outer surface portion 7 of sleeve is pressed by the divergently extending inner surface 10 of the main body of joint to bring the inner surface of sleeve into intimate contact with the outer surface of pipe. If the annular packing 8 is placed in the position shown in the drawings, at this time the packing will be subjected to a compressive force and brought into intimate contact with the divergently extending inner surface 10 of the main body 9, the outer end of sleeve and the outer surface of pipe so as to provide a fluid-tight seal therebetween. If the pipe joint is used in pipes handling a fluid at low pressure, the packing may be done without and a sealing agent may be applied instead to the inner surface of sleeve.

Turning to the operation of the pipe joint according to this invention, the strength with which the joint joins the pipes together will be described. Generally, when a pipe is subjected to an internal pressure and broken, the magnitude of stress applied to the pipe axially thereof is one-half that of the stress applied thereto diametrically thereof which tends to expand the wall of pipe outwardly. In the case of the pipe joint according to this invention, the provision of the cap nut prevents outward expansion of pipe wall and sleeve. Therefore, one has only to consider the stress acting on the pipe axially thereof.

Assuming that the sleeve 4, ring 3 and pipe 1 are made of the same material and the annular groove 2 has a semi-circular cross-section, the diameter of the ring must be such that the ring can withstand a shearing force acting axially of the pipe. In order to impart to the joint a strength which is of the same order as the rupture strength of pipe, one has only to make the diameter of ring one-half as large as the thickness of pipe. If the tensile force and shearing force are assumed to be equal to each other, it will be possible to design the joint such that the strength of the joint is higher than the rupture strength of pipe because the portion of pipe wall underlying annular groove has a thickness which is three-fourths the thickness of pipe wall.

Particularly in the case of a pipe of smaller thickness, the material of the groove is moved inwardly by the pressure of a roller when the groove is formed by form rolling, so that a reduction in thickness is small as shown in FIG. 1. FIG. 1 shows an example of forming by form rolling a semi-circular groove of 1.2 mm. in diameter in a steel pipe of small thickness having an outer diameter of 15 mm. and a thickness of 1 mm. The groove formed includes a bottom having a thickness of 0.9 mm. which shows no substantial reduction in the thickness of pipe.

Thus, the groove has a larger dimension than the aforementioned theoretical dimension, thereby ensuring that the pipes are positively joined together.

The small thickness steel pipe of the aforementioned dimensions has a destruction strength of 550 atmospheres. The use of the pipe joint of this invention thus offers a great advantage in that it permits the use of annealed steel pipes of small thickness which are easy to bend in place of ordinary pipes when they are intended to handle high pressure fluid.

The ring is generally made of a hard steel or stainless steel wire. In case such ring is used, the tensile force of the ring is higher in magnitude than that of the pipe, thereby further increasing the strength of the joint.

In conventional intrusion joints, the material of the sleeve has been limited to mild steel which can be treated for case hardening and which is capable of plastic deformation. The sleeve of pipe joint according to this invention can be made of mild steel, semi-hard steel or stainless steel as desired. Tests conducted on the destruction strength of the joint according to this invention by using large thickness pipes having a higher strength than the joint show that the destruction strength of the joint as used in the pipes of 15 mm. in outer diameter shown in FIG. 1 together with the ring of a piano wire having a diameter of 1.2 mm. is 1,600 atmospheres. No leaks were observed till destruction occured. It will be appreciated that the pipe joint according to this invention is useful for both large thickness pipes and small thickness ones.

If the pipe rotates with the cap nut when it is applied to the sleeve for clamping the same to the pipe or removing it therefrom, it will interfere with the piping operation or may damage the packing. However, since the cone angle α formed by the divergently extending inner surface of cap nut and the axis of pipe is larger than the angle β formed by the divergently extending inner surface of main body of the joint and the axis of pipe as shown in FIG. 1, the aforementioned disadvantages can be obviated.

Generally, a tolerance of 1/100 in outer diameter and elliptic deformation are allowed in steel pipes for general use. Therefore, even if an O-ring or the like is employed as a packing with a joint, the O-ring will be forced out of its position between the gap of the pipe and the sleeve, so that the O-ring will be of no practical value. The use of an O-ring as the packing in the pipe joint according to this invention does not permit the O-ring to be forced out of its position because there is no gap between the pipe and the inner surface of sleeve. Besides, the O-ring of the pipe joint according to this invention makes it possible to provide a perfect seal between the joint and pipe even if the pipe surface is considerably rough.

Generally, conventional intrusion joints tend to permit leakage of fluid when they are repeatedly mounted and removed many times. That is, if the protrusion of the sleeve is loosened after it has been caused to bite into the pipe (particularly when the pipe has a smaller thickness), it cannot be brought into intimate contact with the pipe again because of its spring back. Although such sleeve is not dislodged from the pipe, it is loosened such that it idly rotates in its position. Therefore, it may be brought out of phase with the pipe when it is clamped to the pipe again or foreign matter, such as incrustation or rust, may find its way between the sleeve and pipe, thereby causing leakage of fluid. This invention obviates this disadvantage of intrusion joints of the prior art.

To sum up, the pipe joint according to this invention offers many advantages. One of such advantages is that the joint has a strength which is higher than the destruction strength of pipe, thereby preventing the leakage of fluid. Another advantage lies in the fact that the torque required for clamping the sleeve to the pipe is much smaller (about one-fifth) than is the case with conventional intrusion joints, because no portion of the sleeve bites into the pipe and the ring enclosing portion of the sleeve is worked on in the reducing operation such that it merely undergoes simple deformation and no flow of molecules occurs (plastic deformation does not substantially take place). In joining pipes with the pipe joint according to this invention, it is not required to carry the pipes to the working table, but the pipes can be joined together on the site of assembly by using a conventional spanner. Combined with the use of a torque of low order mentioned above, the fact that a very low manual force is required for forming the groove on the pipe by form rolling makes it possible to join pipes of larger diameter than those which have hitherto been joined by conventional intrusion joints. The pipe joint according to this invention has particular utility in pipes of small thickness in which conventional intrusion joints have no application. Thus, this invention permits great reductions in the cost of piping operations.

While a cap nut has been used for clamping the sleeve to a pipe in the embodiment shown and described above, it is to be understood that flanges may be used and damped by means of bolts in case the pipe joint, according to this invention, is used to join pipes of medium diameter, and a ring having a tapered inner surface may be force fitted axially be means of hydraulic equipment in the case of pipes of large diameter.

What is claimed is:

1. A pipe joint comprising a main body, an incomplete ring having a cut-out portion in its circumference and arranged to be fitted in an annular groove formed on the surface of a pipe to be joined which annular groove has a depth of about one-half the diameter of said ring, an axially extending sleeve having a forward end of an inner diameter slightly larger than the outer diameter of said ring and located outwardly from said ring and rearward end of an inner diameter slightly larger than the outer diameter of the pipe and extending in the axial direction away from said ring, the inner diameter at the rearward end of said sleeve continuing for a portion of the axial length of said sleeve to a first position spaced axially from the forward end of said sleeve, a first inner surface on said sleeve extending from the first position in the axial direction outwardly from the inner diameter to a frusto-conically shaped surface diverging toward the forward end of said sleeve, a second inner surface on said sleeve extending from said first inner surface toward the forward end of said sleeve and converging inwardly from the end of said first inner surface toward the axis of said sleeve and having a surface configuration substantially similar to the surface of said ring, a third inner surface on said sleeve extending from the end of said second inner surface to the forward end of said sleeve and said third inner surface diverging outwardly from the end of said second inner surface and having a frusto-conically shaped surface, a first outer surface on said sleeve positioned outwardly opposite said first inner surface and having a frusto-conically shaped surface diverging toward the forward end of said sleeve with said first outer surface disposed substantially parallel with said first inner surface, a second outer surface on said sleeve extending from said first outer surface to the forward end of said sleeve and having a frusto-conically shaped surface with an angle of divergence relative to the axis of said sleeve which is less than the similar angle of divergence of said first outer surface, said sleeve having a third outer surface extending from its rearward end toward its forward end and spaced axially from said first outer surface on said sleeve, said third outer surface having a frusto-conically shaped surface diverging outwardly from the rearward end toward the forward end, said main body having a first end disposed in laterally enclosing relationship about the rearward end of said sleeve and said main body extending axially from its first end in the direction opposite to the forward end of said sleeve, said main body having an inner surface at its first end disposed in contact with the third outer surface of said sleeve and said inner surface of said main body having a frusto-conically shaped surface converging in the axial direction away from the first end of said main body, an axially extending clamping member enclosing said sleeve and the first end of said main body and disposed in contact with the forward end of said sleeve and in threaded engagement with said main body, said clamping body having an inner surface in contact with the forward end of said sleeve and said inner surface of said clamping body having a frusto-conically shaped surface diverging outwardly in the axial direction extending toward said main body, and by threading said clamping member onto said main body and forcing it in the axial direction toward the rearward end of said sleeve, said inner surface on said clamping body bends said second inner surface on said sleeve inwardly into intimate contact with the surface of said ring and said third inner surface inwardly into intimate contact with the surface of the pipe adjacent said ring and said third outer surface on said sleeve is pressed against said inner surface on the first end of said main body.

2. A pipe joint, as set forth in claim 1, wherein said incomplete ring is of circular shape in radial section for seating in a semi-circular shaped groove in the pipe.

3. A pipe joint, as set forth in claim 1, wherein an annular packing is arranged to be mounted on the pipe abutting the rearward end of said sleeve so that when the third outer surface of said sleeve is pressed against the inner surface at the first end of said main body, said annular packing is pressed into intimate contact with the surface of the pipe and with said inner surface at the first end of said main body.

4. A pipe joint, as set forth in claim 1, wherein said clamping member is a cap nut and its inner surface in contact with the forward end of said sleeve forms an angle of divergence with the axis of said sleeve which is greater than the angle of divergence formed with the axis of said sleeve by said inner surface at the first end of said main body.

* * * * *